June 1, 1926.

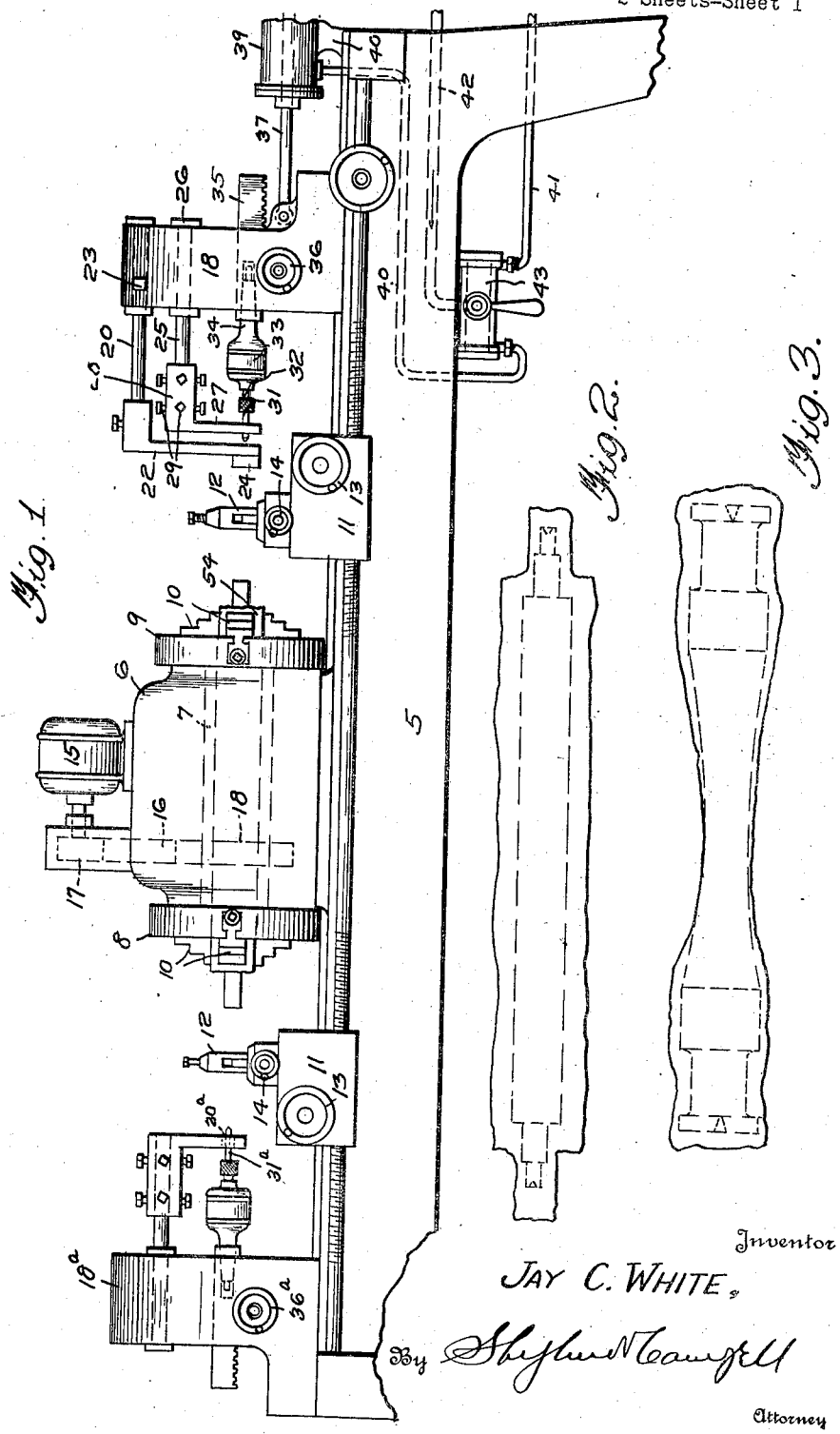

J. C. WHITE

LATHE

Filed Sept. 28, 1925

1,587,261

2 Sheets-Sheet 2

Inventor
JAY C. WHITE,
By Shepherd Campbell
Attorney

Patented June 1, 1926.

1,587,261

UNITED STATES PATENT OFFICE.

JAY C. WHITE, OF NEW CASTLE, PENNSYLVANIA.

LATHE.

Application filed September 28, 1925. Serial No. 59,095.

This invention relates to a machine for centering rough forgings which are afterwards to be machined. Under present day practice, much time is lost in properly centering rough forgings in lathes, preparatory to machining the same. The object of the present invention is to provide a machine into which a rough forging may be quickly slipped and which machine will serve to cut off and square up the ends of the forging and thereafter centrally indent the ends so that the forging may thereafter be expeditiously mounted upon the usual centers of a lathe for machining. By this preliminary centering and cutting off operation, I am enabled to greatly reduce the time required for machining a given piece of work with a corresponding marked reduction in the cost of the same.

Further objects and advantages of the invention will be set forth in the detailed description which follows.

Figure 4:
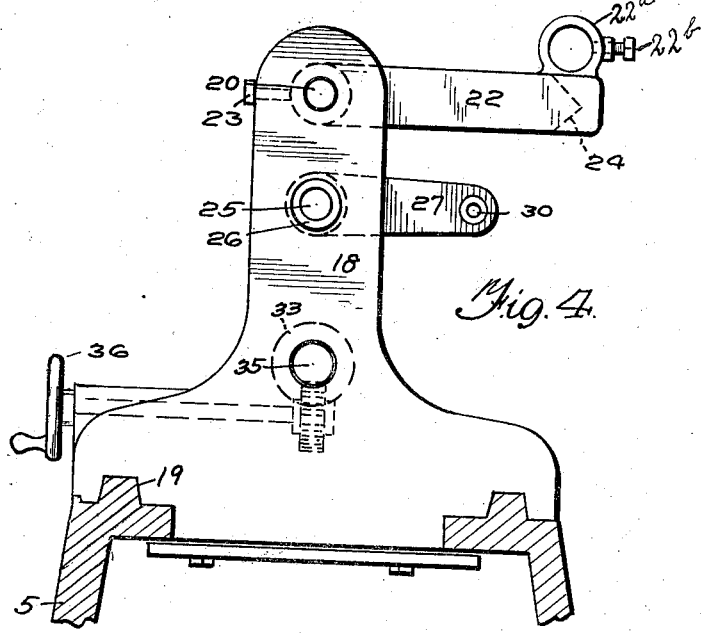
Figure 8:
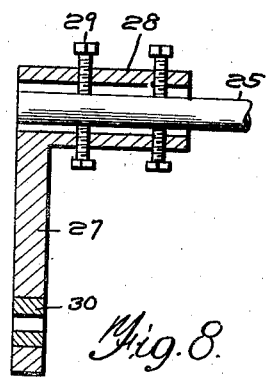
Figure 5:
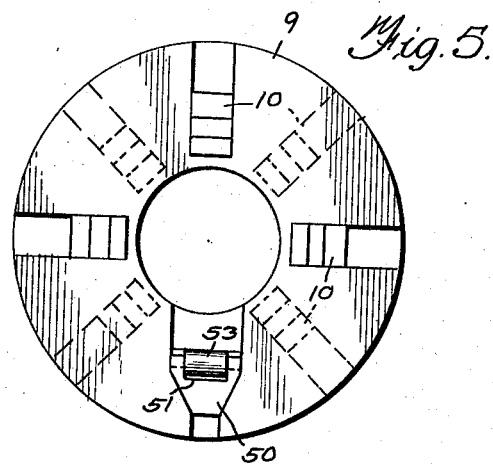
Figure 6:
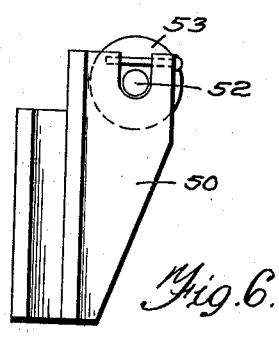
Figure 7:
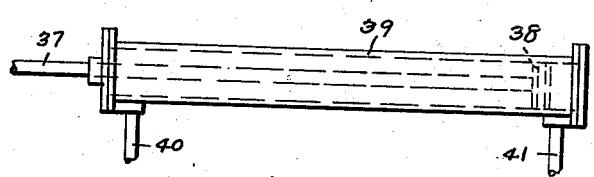

In the accompanying drawings,

Fig. 1 is a side elevation of a machine constructed in accordance with the invention, Figs. 2 and 3 are rough forgings constituting examples of the work to be acted upon by the machine, Fig. 4 is a detail view of tool carrying stock hereinafter described, Fig. 5 is a detail face view of one of the chucks hereinafter described, Fig. 6 is a detail view of a roller jaw hereinafter described, Fig. 7 is a view of a pneumatic cylinder hereinafter described, and, Fig. 8 is a view of a drill centering structure.

Like numerals designate corresponding figures in all of the figures of the drawings.

The cutting off and centering machine of the present invention comprises a frame 5 which carries an upstanding head 6. A sleeve 7 is mounted for rotation in said head and extends entirely therethrough, said sleeve being open from end to end to permit of the passage of the forgings therethrough. The sleeve carries a chuck at each end, said chucks being designated at 8 and 9. Each chuck carries a plurality of radially movable jaws 10, such as are common in constructions of this character. Carriages 11 carry tool posts 12, said carriages being movable longitudinally of the frame 5 under the influence of hand wheels 13 and the tool posts being transversely adjustable with respect to the frame 5 under the influence of hand wheels 14 in a manner common in lathe constructions. A motor 15 drives through any suitable connections such as the silent chain 16 and correspondingly shaped sprocket wheels 17 and 18, to the sleeve 7.

A block 18 is channeled at 19 to slide upon correspondingly shaped ways of the frame 5. Block 18 constitutes a mounting for a shaft 20. An arm 22 is mounted upon the outer end of the shaft 20 and is adapted to swing thereon. Said arm 22 may be bound in any position to which it is swung by means of a set screw 23. At its outer or free end the arm 22 carries a V-shaped rest 24. A shaft 25 is mounted to turn in the block 18 but is held against endwise movement with respect thereto by collars 26. The shaft 25 carries a swinging arm 27, the hub 28 of which may be adjusted with respect to the shaft 25 by means of set screws 29. The purpose of this adjustment is to accurately center a guide 30 carried by the arm 27 and which serves as a guide for a centering drill 31 that is secured in the chuck 32 of a power driven drill element 33. This may be an electric drill, a pneumatic drill or any other self propelled drilling element. The shank 34 of the drill element, is secured in a shaft 35 and this shaft is capable of longitudinal adjustment in the block 18 under the influence of an adjusting hand wheel 36.

The block 18 is moved longitudinally by means of a piston rod and piston 37 and 38, the latter travelling in a cylinder 39 which is fixed to the frame of the machine by standards 40. Air supply pipes 40 and 41 lead to the front and rear ends respectively of the cylinder 39 and air is supplied thereto from a supply pipe 42. A controlling valve 43 alternately admits air to the front and rear ends of the cylinder and exhausts the end of the cylinder opposite the end to which air is being admitted.

In Fig. 2, I have illustrated a tin machine roll and in Fig. 3, I have illustrated an axle. The full lines in said figures represent the shape of the rough forgings before they are machined and the dotted lines represent the shape of these forgings after they are machined or, in other words, the dotted lines represent the shape of the finished article.

In the use of the machine of the present invention, the forging to be centered is picked up by a suitable crane (not shown) and swung into the right hand end of the tube 7 and into the chuck 9, the jaws of which are then open. The right hand end of the forging is then lowered by the crane until it rests in V-shaped block 24 upon the arm 22, said arm at this time occupying a vertical position.

The valve 43 is then manipulated to admit air to the right hand end of the cylinder 39 which forces the piston rod 37 and block 18 to the left, thereby forcing the forging the desired distance through tube 7. Block 18 is then retracted slightly and the arm 22 is swung upwardly to a horizontal position where it will be out of the way and it is held in this elevated position by set screw 23. Motor 15 is then set in operation to rotate the chuck and the forging and the cut off tools 12$^a$ are utilized to cut off and square the ends of the work. After the ends of the work have been cut off and squared, centering drill 31 or a substituted reamer is advanced by means of hand wheel 36 through guide 30 to form a conical depression in the end of the forging, such depression constituting, thereafter, the centering depression for that end of the work. The guide 30 is used only until the drill is "spotted", after which the arm 27 is swung to one side and the depression is drilled and reamed. The left hand end of the stock is spotted, drilled and reamed in the same manner through the medium of a drill 31$^a$ which is spotted by guide 30$^a$, these parts being mounted in a stock or head 18$^a$ and the drill being advanced bodily by hand wheel 36$^a$, these parts corresponding to the like parts at the right hand end of the machine.

When the ends of the work are being cut off, the work turns under the influence of the motor 15 and chucks 8 and 9, while, when the centers are being formed, the work remains stationary and only the drills 31, 31$^a$ turn. After the operation has been completed, the cylinder 39 and associated parts may be utilized to withdraw the work from the chuck so that it may again be engaged by the crane, this being accomplished by providing a dog 22$^a$ on the side of the arm 22. If the end of the stock be inserted in this dog and if set screw 22$^b$ be tightened on the work, movement of the arm 22 to the right with block 18, under the influence of piston rod 37 and piston 38 will withdraw the work from the chuck to a point where it may again be engaged by the crane.

To facilitate the entry of the work into the chuck, the jaws upon the chucks are disposed out of line with each other. In other words, the jaws of the left hand chuck are advanced one-eighth of a turn with respect to the jaws of the right hand chuck, as illustrated in Fig. 5, where the jaws illustrated in full lines indicate the jaws of the right hand chuck and the jaws indicated in dotted lines are those of the left hand chuck. Furthermore, the lowermost jaw of the right hand chuck is a special jaw which is adapted to be substituted for the conventional form of jaw. This jaw is illustrated in Fig. 6 from which it will be seen that the body of the jaw, indicated at 50, is provided with recesses 51 which constitute bearings for the reduced ends 52 of a bearing roller 53. The stock or work, indicated at 54, rolls over this roller 53 which constitutes an antifriction mounting for the same as the stock is pushed into place under the influence of the pneumatic cylinder. At this time, the two lower jaws of the left hand chuck are backed out so that the work may slip freely in place. The remaining jaws of the right hand chuck constitute gripping jaws and all of the jaws of the left hand chuck are gripping jaws.

Manifestly, other ways will readily suggest themselves to persons skilled in the art for accomplishing the results achieved by this structure. Therefore, it is to be understood that the invention is not limited to the precise construction set forth but that it includes within its purview whatever changes fairly come within either the terms or the spirit of the appended claims.

Having described my invention, what I claim is:

1. A machine of the character described comprising a supporting frame, a head carried thereby, a tubular member mounted in said head for rotation, means for rotating said member, chucks carried by said tubular member on opposite sides of the head, said chucks being adapted to grip rough forgings, a power driven drill at each side of the head, means for advancing said drill towards the chucks, a pneumatic cylinder, a slidable stock, and a work engaging element carried by said stock adapted to engage the work and force it into said tubular element when said stock is moved by the pneumatic cylinder.

2. A machine of the character described comprising a supporting frame, a head carried thereby, a tubular member mounted in said head for rotation, means for rotating said tubular member, chucks carried by said tubular member on opposite sides of the head, said chucks being adapted to grip rough forgings, a power driven drill at each side of the head, means for advancing said drills towards the chucks, a pneumatic cylinder, a stock actuated thereby in both directions, and a work supporting and engaging member carried by said stock and adapted when the stock is moved in one direction by the pneumatic cylinder to force the work into the tubular member and to withdraw the work from said tubular member when the stock is forced in the other direction by said pneumatic cylinder.

3. A structure as recited in claim 5, in combination with cut off tools and carriages upon each side of said head.

4. A device of the character described comprising a supporting frame, a central head, a tubular member mounted for rotation therein, a motor for driving said tubular member, chucks at each end of said tubular member, a plurality of gripping jaws carried by each of said chucks, a roller carrying jaw carried by one of said chucks, a stock slidable upon the frame, a pneumatic cylinder engaged with said stock and adapted to actuate it in both directions, a swinging arm supported from said stock and having a work supporting rest facing toward said chuck which has the roller carrying jaw, a work engaging dog carried by said arm, a die carrying arm supported from said stock, a motor driven drill and a longitudinally movable member carried by said stock and in turn carrying said drill, all as and for the purposes set forth.

5. A machine of the character described comprising a bed, a head thereon, chucks upon each side of said head, there being a passageway through the head to permit of work being passed through the head to be simultaneously engaged by said chucks, means for rotating said chucks, a stock mounted to slide upon the bed toward and from one of the chucks, a power element for moving said stock, a power drill mounted upon the stock and movable bodily therewith, and means for moving the power drill longitudinally of the bed and independently of the stock.

6. A machine of the character described comprising a bed, a head thereon, chucks upon each side of said head, there being a passageway through the head to permit of work being passed through the head to be simultaneously engaged by said chucks, means for rotating said chucks, a stock mounted to slide upon the bed toward and from one of the chucks, a power element for moving said stock, a power drill mounted upon the stock and movable bodily therewith, and a work supporting element carried by the stock and movable to and from a position in alignment with the drill, said work supporting element serving to support one end of the work while the latter is being thrust into the chucks under the influence of the movement of the stock, and said work supporting element being movable out of the path of the drill after the work has been mounted in the chucks to permit the drill to form a centering depression in the end of the work.

7. A machine of the character described comprising a bed, a head thereon, chucks upon each side of said head, there being a passageway through the head to permit of work being passed through the head to be simultaneously engaged by said chucks, means for rotating said chucks, a stock mounted to slide upon the bed toward and from one of the chucks, a power element for moving said stock, a power drill mounted upon the stock and movable bodily therewith, and a drill guide mounted upon and bodily movable with the stock and adapted to be swung to and from positions of alignment with the drill.

8. A machine of the character described comprising a rotative head, having a chuck at each end thereof, adapted to grip rough forgings, a tubular member connecting said chucks, and external driving means for the tubular member, each of the chucks comprising a plurality of jaws and the jaws of one chuck being disposed in staggered relation with respect to the jaws of the other chuck, said tubular member permitting the passage of stock endwise through both of said chucks.

In testimony whereof I affix my signature.

JAY C. WHITE.